(12) United States Patent
Amemiya

(10) Patent No.: US 10,371,103 B2
(45) Date of Patent: Aug. 6, 2019

(54) VAPORIZED FUEL INTRODUCTION APPARATUS

(71) Applicant: SUBARU CORPORATION, Tokyo (JP)

(72) Inventor: Keisuke Amemiya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 188 days.

(21) Appl. No.: 15/654,770

(22) Filed: Jul. 20, 2017

(65) Prior Publication Data

US 2018/0087476 A1 Mar. 29, 2018

(30) Foreign Application Priority Data

Sep. 26, 2016 (JP) ................................ 2016-187308

(51) Int. Cl.
*F02M 25/08* (2006.01)
*F02B 37/22* (2006.01)
(Continued)

(52) U.S. Cl.
CPC ....... *F02M 25/0836* (2013.01); *F02B 37/225* (2013.01); *F02B 37/24* (2013.01);
(Continued)

(58) Field of Classification Search
CPC F02M 25/0836; F02M 31/183; F02B 37/225; F02B 37/24; Y02T 10/144; F23K 5/22
See application file for complete search history.

(56) References Cited

U.S. PATENT DOCUMENTS 9,353,711 B2 * 5/2016 Edmund ............ F02M 25/0872
9,664,154 B2 * 5/2017 Bucknell .......... F02M 35/10229
(Continued)

FOREIGN PATENT DOCUMENTS

JP S61-149520 A 7/1986
JP H11-30127 A 2/1999
(Continued)

OTHER PUBLICATIONS

Japanese Office Action dated Mar. 27, 2018 for JP Patent Application No. 2016-187308 (3 pages in Japanese with English translation).

*Primary Examiner* — Freddie Kirkland, III
(74) *Attorney, Agent, or Firm* — Smith, Gambrell & Russell, LLP

(57) ABSTRACT

A vaporized fuel introduction apparatus introduces vaporized fuel to an intake system that includes a compressor housing that houses a compressor impeller and an intake duct that is coupled to an upstream side of the compressor housing. The vaporized fuel introduction apparatus includes a circulation path, a vaporized fuel introduction path, and an ejector mechanism. The circulation path is made up of a housing-side flow path provided as a single body with the compressor housing and a duct-side flow path provided as a single body with the intake duct. The circulation path circulates compressed air flowing in a portion of the compressor housing which is downstream of the compressor impeller to the intake duct. The vaporized fuel introduction path is coupled to the circulation path and guides the vaporized fuel. The ejector mechanism is provided in the circulation path.

2 Claims, 3 Drawing Sheets

(51) Int. Cl.
*F02B 37/24* (2006.01)
*F02M 31/18* (2006.01)
*F23K 5/22* (2006.01)

(52) U.S. Cl.
CPC .............. *F02M 31/183* (2013.01); *F23K 5/22* (2013.01); *Y02T 10/144* (2013.01)

(56) References Cited

U.S. PATENT DOCUMENTS

| | | | |
|---|---|---|---|
| 9,835,120 B2 * | 12/2017 | Stefaniak | ......... F02M 35/10229 |
| 9,885,323 B1 * | 2/2018 | Myers | ................ F02M 25/0872 |
| 9,993,968 B2 * | 6/2018 | Moyer | .................... B29C 66/54 |
| 2014/0219779 A1 | 8/2014 | Matsui | |
| 2015/0369184 A1 | 12/2015 | Bucknell et al. | |

FOREIGN PATENT DOCUMENTS

| | | |
|---|---|---|
| JP | 2013-60878 A | 4/2013 |
| JP | 2014-240622 A | 12/2014 |
| JP | 2015-175234 A | 10/2015 |
| WO | 2013/057809 A1 | 4/2013 |

\* cited by examiner

VAPORIZED FUEL INTRODUCTION APPARATUS

CROSS-REFERENCE TO RELATED APPLICATIONS

The present application claims priority from Japanese Patent Application No. 2016-187308 filed on Sep. 26, 2016, the entire contents of which are hereby incorporated by reference.

BACKGROUND

1. Technical Field

The present invention relates to a vaporized fuel introduction apparatus that introduces vaporized fuel from a fuel tank to an intake flow path of an engine.

2. Related Art

Related-art vehicles are equipped with a vaporized fuel introduction apparatus that introduces vaporized fuel created in a fuel tank to an engine's intake flow path so that the vaporized fuel is burned in the combustion chamber.

Such a vaporized fuel introduction apparatus is described in, for instance, Japanese Unexamined Patent Application Publication (JP-A) No. 2014-240622. In the technology described in JP-A No. 2014-240622, vaporized fuel created in a fuel tank is adsorbed onto activated carbon contained in a canister and the vaporized fuel adsorbed in the canister is desorbed from the activated carbon and introduced to an intake flow path by flowing compressed air pressurized by a supercharger through an ejector.

In the vaporized fuel introduction apparatus described in JP-A No. 2014-240622, the ejector is provided in a purge flow path independently of the intake flow path. Therefore, a passageway for guiding compressed air from the supercharger to the ejector and a passageway for guiding compressed air and vaporized fuel from the ejector to the intake flow path are coupled to the vaporized fuel introduction apparatus. This gives rise to problems of an increased number of component parts and a complex assembly operation.

SUMMARY OF THE INVENTION

It is desirable to provide a vaporized fuel introduction apparatus that makes it possible to reduce the number of component parts.

An aspect of the present invention provides a vaporized fuel introduction apparatus configured to introduce vaporized fuel to an intake system. The intake system comprises a compressor housing that houses a compressor impeller and an intake duct that is coupled to an upstream side of the compressor housing. The vaporized fuel introduction apparatus includes: a circulation path that includes a housing-side flow path provided as a single body with the compressor housing and a duct-side flow path provided as a single body with the intake duct and that is configured to circulate compressed air flowing in a portion of the compressor housing which is downstream of the compressor impeller to the intake duct. The apparatus further includes a vaporized fuel introduction path that is coupled to the circulation path and configured to guide the vaporized fuel and an ejector mechanism that is provided in the circulation path.

The housing-side flow path may fork from a compressor scroll path that is provided in the compressor housing.

Furthermore, the compressor housing may have, in a coupling surface coupled to the intake duct, a recess that is configured to communicate with the housing-side flow path and that is recessed to a predetermined depth. The ejector mechanism may include an ejector body having a tapered shape whose inside diameter decreases from an upstream side toward a downstream side. The intake duct may have, on a coupling surface coupled to the compressor housing, a protrusion that is provided with at least a portion of the ejector body and that is inserted into the recess.

DETAILED DESCRIPTION

Preferred examples of the present invention will be described in detail hereinafter with reference to the accompanying drawings. Dimensions, materials, numerical values, and the like indicated in conjunction with examples of the invention are merely illustrative for the purpose of facilitating the understanding of the invention and are not intended to limit the invention unless otherwise specified. In this specification and the accompanying drawings, elements that have substantially the same functions and constructions are referred to using the same characters and are not redundantly described and, furthermore, elements not directly relevant to the invention are omitted from the drawings.

Figure 1:
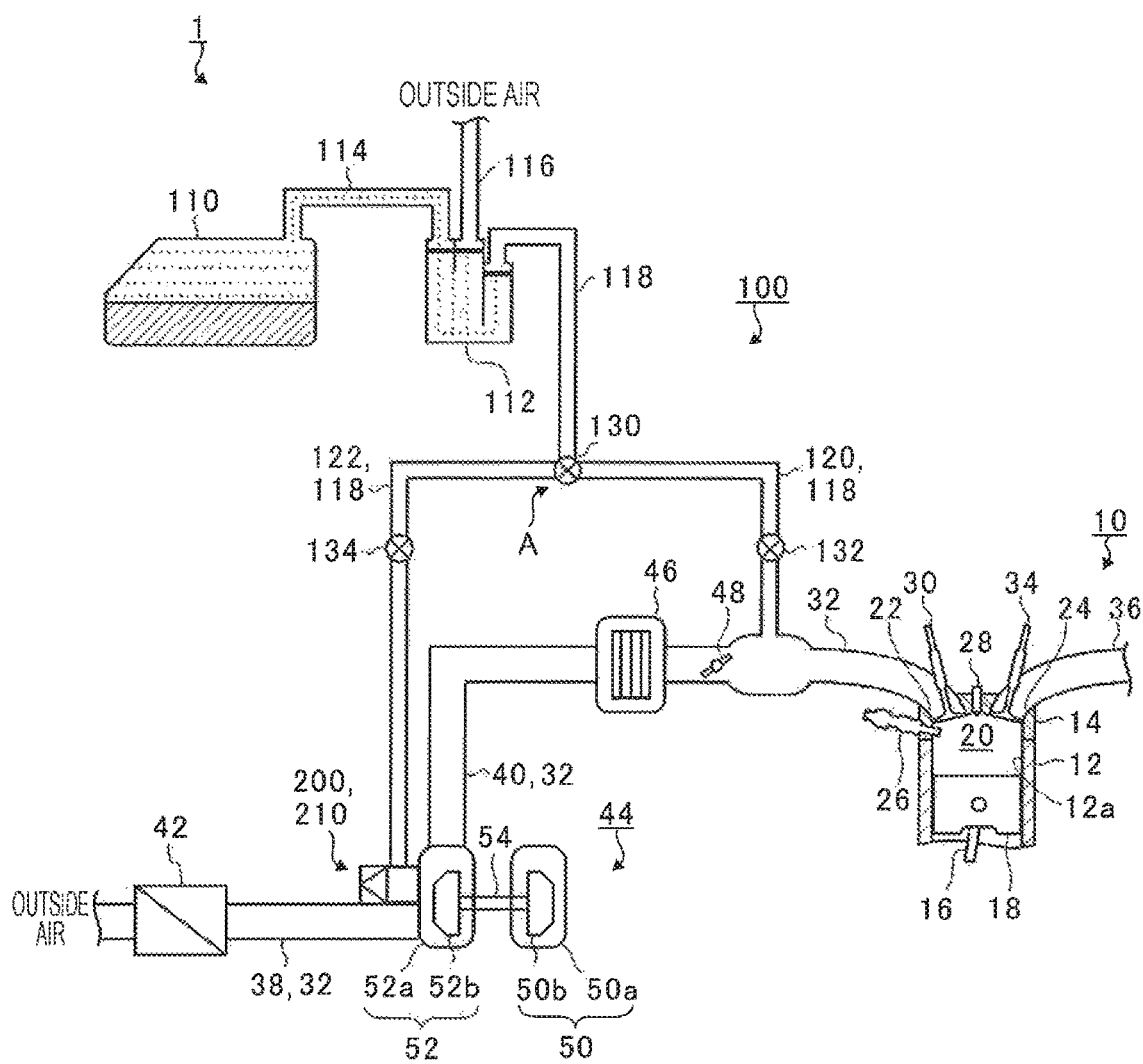
FIG. 1 is a schematic diagram illustrating a construction of a vehicle equipped with an engine and a vaporized fuel introduction apparatus.

FIG. 1 is a schematic diagram illustrating a construction of a vehicle 1 equipped with an engine 10 and a vaporized fuel introduction apparatus 100. A general construction of the engine 10 will first be described and then a vaporized fuel introduction apparatus 100 according to an example of the invention will be described in detail. In the following description, constructions and processes relevant to this example will be described in detail, and those irrelevant to this example will not be described.

As illustrated in FIG. 1, the vehicle 1 includes the engine 10, the vaporized fuel introduction apparatus 100, and a fuel tank 110 and runs on motive power from the engine 10.

The engine 10 includes a cylinder block 12, a cylinder head 14, and a piston 18 supported by a connecting rod 16 so as to be slidable within a cylinder bore 12a formed in a cylinder block 12. A space surrounded by the cylinder bore 12a, the cylinder head 14, and a crown surface of the piston 18 forms a combustion chamber 20.

The cylinder head 14 has an intake port 22 and an exhaust port 24. The cylinder head 14 is provided with an injector 26 and an ignition plug 28. An end of the intake port 22 has an opening to the combustion chamber 20 and is opened and closed by the intake valve 30, and another end of the intake port 22 communicates with an intake flow path 32. An end of the exhaust port 24 has an opening to the combustion chamber 20 and is opened and closed by the exhaust valve 34, and another end of the exhaust port 24 communicates with an exhaust flow path 36.

In the engine 10, intake air flows into the combustion chamber 20 through the intake flow path 32 and the intake port 22, fuel supplied from the fuel tank 110 is injected into the intake air by the injector 26, and the injected fuel is then ignited by the ignition plug 28 to burn. The combustion pressure thus produced pushes the piston 18 to turn a crankshaft (not depicted). Then, exhaust gas produced by fuel burning within the combustion chamber 20 is discharged through the exhaust port 24 and the exhaust flow path 36.

The intake flow path 32 is provided with an air cleaner 42, a compressor 52 of a supercharger 44, a charge air cooler 46, and a throttle valve 48 that are disposed in this order from upstream. Incidentally, the intake flow path 32 is formed as an intake system, mainly by an upstream compressor duct (intake duct) 38 that extends upstream of the compressor 52 and a downstream compressor duct 40 that extends downstream of the compressor 52.

Intake air introduced to the intake flow path 32 from outside is guided to the supercharger 44 through the air cleaner 42.

The supercharger 44 includes a turbine 50, the compressor 52, and a rotor shaft 54. The turbine 50 is made up of a turbine housing 50a that is provided on the exhaust flow path 36 and whose internal space functions additionally as a part of the exhaust flow path 36 and a turbine impeller 50b that is housed within the turbine housing 50a. The turbine impeller 50b is rotated by exhaust gas discharged from the combustion chamber 20. Note that FIG. 1 omits a flow path that extends from the exhaust flow path 36 to the turbine 50.

The compressor 52 is made up of a compressor housing 52a whose internal space functions additionally as a part of the intake flow path 32 and a compressor impeller 52b housed within the compressor housing 52a. The compressor impeller 52b is coupled to the turbine impeller 50b via the rotor shaft 54 and is rotatable together with the turbine impeller 50b. The compressor impeller 52b is rotated by rotational power of the turbine impeller 50b to compress intake air.

The charge air cooler 46 cools the air having been heated when compressed by the compressor 52. The degree of opening of the throttle valve 48 is changeable by an actuator (not depicted) that is in turn controlled by varying the operation amount of an accelerator. In this manner, the throttle valve 48 adjusts the amount of air delivered to the engine 10.

In the fuel tank 110, fuel vaporizes, creating vaporized fuel. In order to prevent vaporized fuel from leaking out into the outside air, the vehicle 1 is provided with the vaporized fuel introduction apparatus 100. The vaporized fuel introduction apparatus 100 introduces vaporized fuel to the intake flow path 32, so that the vaporized fuel is burned together with the intake air in the combustion chamber 20.

The vaporized fuel introduction apparatus 100 includes a fuel tank 110 and a canister 112 that communicate with each other through a vapor flow path 114. The canister 112 is filled with activated carbon (adsorbent). Vaporized fuel created in the fuel tank 110 flows through the vapor flow path 114 into the canister 112 and is adsorbed onto the activated carbon packed in the canister 112.

The canister 112 communicates with the outside through an outside air introduction path 116 coupled thereto and communicates with the intake flow path 32 through a purge flow path 118 coupled thereto.

When the purge flow path 118 is at negative pressure, outside air is drawn in through the outside air introduction path 116, flows through the interior of the canister 112, and then flows into the purge flow path 118. At this time, the vaporized fuel adsorbed onto the activated carbon in the canister 112 is desorbed (purged) from the activated carbon by the outside air. The purged vaporized fuel is guided together with the outside air through the purge flow path 118, combines with intake air in the intake flow path 32, and is then burned in the combustion chamber 20.

The purge flow path 118 forks, at fork point A illustrated in FIG. 1, into a downstream-side purge flow path 120 and an upstream-side purge flow path 122. The downstream-side purge flow path 120 and the upstream-side purge flow path 122 that fork from the purge flow path 118 communicate separately with the intake flow path 32.

The fork point A of the purge flow path 118 is provided with a purge solenoid valve 130. The downstream-side purge flow path 120 and the upstream-side purge flow path 122 are provided with check valves 132 and 134, respectively, that prevent reverse flow of vaporized fuel.

The downstream-side purge flow path 120 joins the intake flow path 32 downstream of the throttle valve 48 (on a downstream side of the compressor 52).

The upstream-side purge flow path 122 joins a portion of the intake flow path 32, which is upstream of the compressor 52, via a circulation path 200 for compressed air. The circulation path 200 is a flow path for circulating compressed air flowing within the compressor housing 52a downstream of the compressor impeller 52b to the upstream compressor duct 38. The circulation path 200 is formed substantially as a single body in the compressor housing 52a and the upstream compressor duct 38. An ejector mechanism 210 is provided within the circulation path 200.

When the supercharger 44 is not substantially performing supercharging, the negative pressure produced in the intake flow path 32 by the suction stroke of the engine 10 draws outside air into the canister 112 via the outside air introduction path 116, so that vaporized fuel adsorbed inside the canister 112 is desorbed. At this time, the purge solenoid valve 130 is controlled by a controller (not depicted) so as to enable communication between the purge flow path 118 and the downstream-side purge flow path 120.

The vaporized fuel released from the canister 112 is drawn with the outside air into the intake flow path 32 downstream of the throttle valve 48 through the downstream-side purge flow path 120 and the check valve 132.

On the other hand, when the supercharger 44 is performing supercharging, compressed air compressed by the compressor 52 and guided into the circulation path 200 flows through the ejector mechanism 210 disposed in the circulation path 200, so that the compressed air is accelerated and reduced in pressure by a Venturi effect. The negative pressure produced by the ejector mechanism 210 draws outside air into the canister 112 through the outside air introduction path 116 so that vaporized fuel adsorbed inside the canister 112 is desorbed. At this time, the purge solenoid valve 130 is controlled by the controller so as to enable communication between the purge flow path 118 and the upstream-side purge flow path 122. The vaporized fuel released from the canister 112 is introduced with the outside air to the intake flow path 32 within the upstream compressor duct 38 through the upstream-side purge flow path 122 and the check valve 134.

Incidentally, a pressure sensor may be provided in any of the intake flow path 32 upstream of the compressor 52 and the intake flow path 32 downstream of the throttle valve 48 in order to determine the state of driving of the supercharger 44, and the pressure measured by the pressure sensor may be used as a basis for controlling the purge solenoid valve 130.

Figure 2:
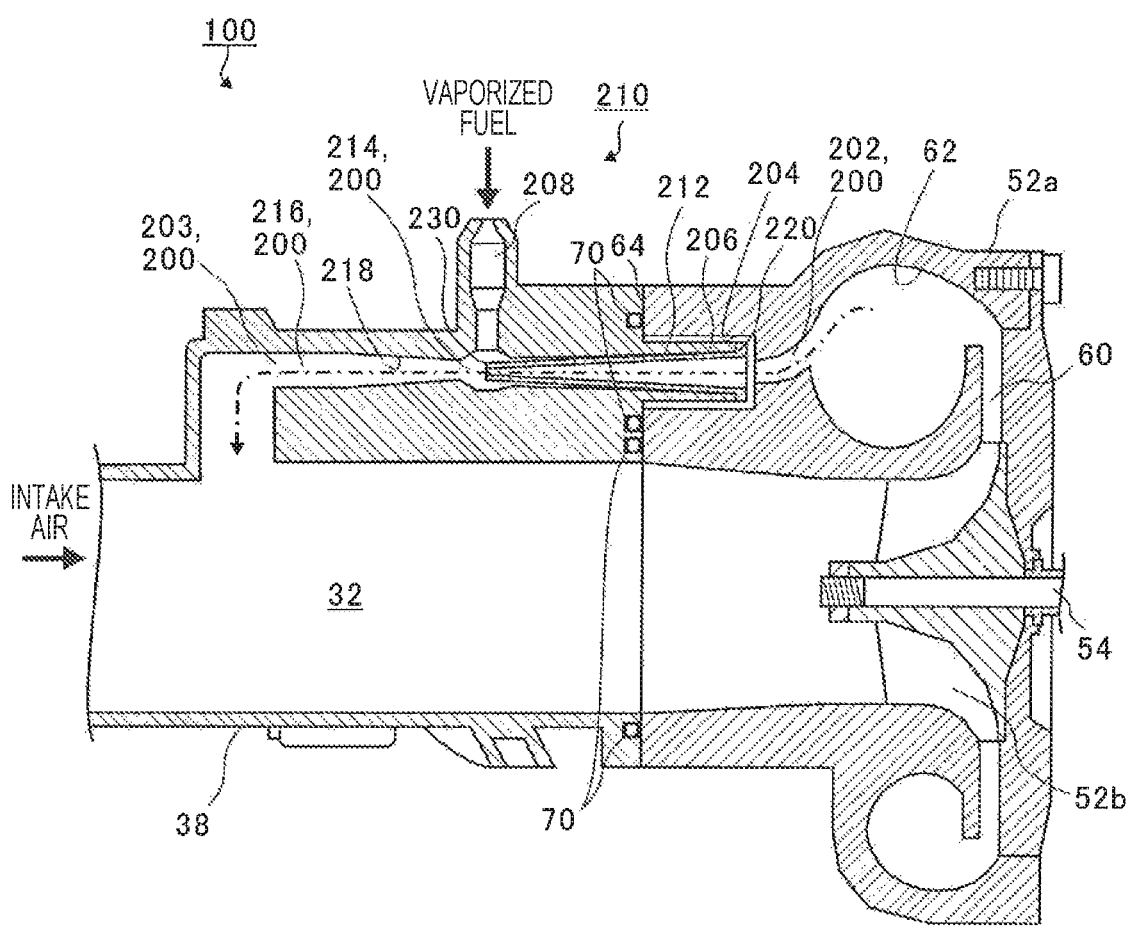
FIG. 2 illustrates a circulation path and an ejector mechanism.

FIG. 2 is a diagram illustrating the circulation path 200 and the ejector mechanism 210. As illustrated in FIG. 2, the circulation path 200 is made up of a housing-side flow path 202 formed as a single body with the compressor housing 52a, and a duct-side flow path 203 formed as a single body with the upstream compressor duct 38. The ejector mechanism 210 is provided within the circulation path 200. The compressor housing 52a and the upstream compressor duct 38 have flanged surfaces (not depicted) that are fastened together by bolts (not depicted). In FIG. 2, flow of compressed air along the circulation path 200 is indicated by a one-dot chain line arrow.

Circulation Path 200

As illustrated in FIG. 2, the compressor housing 52a houses the compressor impeller 52b disposed on an end portion of the rotor shaft 54 that is freely rotatably supported. Furthermore, the compressor housing 52a is provided with a diffuser flow path 60 and an annular compressor scroll path 62 located more outward in the radial direction of the compressor impeller 52b than the diffuser flow path 60.

The compressor scroll path 62 is a flow path in which compressed air flows as the compressor impeller 52b rotates. The compressor housing 52a is provided with the foregoing housing-side flow path 202 that extends from the compressor scroll path 62 to the upstream compressor duct 38 side and that functions as a part of the circulation path 200. Specifically, the housing-side flow path 202 is formed as a branch path branching from the compressor scroll path 62.

A coupling surface 64 of the compressor housing 52a coupled to the upstream compressor duct 38 is provided with a recess 204 of a predetermined depth in the direction of a rotating axis (an axis direction of the rotor shaft 54) of the compressor impeller 52b. The recess 204 is formed so as to communicate with the housing-side flow path 202.

The upstream compressor duct 38 has, at a location that faces the recess 204 of the compressor housing 52a, a protrusion 206 that protrudes forward the compressor housing 52a side. The protrusion 206 is inserted into the recess 204.

The upstream compressor duct 38 is provided with the duct-side flow path 203 that functions as a part of the circulation path 200. The duct-side flow path 203 extends from the protrusion 206 at a distance from the intake flow path 32 so as to be substantially parallel with the intake flow path 32. The duct-side flow path 203 is provided with the ejector mechanism 210. The ejector mechanism 210 communicates, at a terminal end thereof, with the intake flow path 32.

Incidentally, the protrusion 206 of the upstream compressor duct 38 has an outside diameter that is slightly smaller than an inside diameter of the recess 204 of the compressor housing 52a. Therefore, a predetermined clearance is maintained between the protrusion 206 of the upstream compressor duct 38 and the recess 204 of the compressor housing 52a. The coupling surface 64 between the upstream compressor duct 38 and the compressor housing 52a is provided with an O-ring 70 encircling the intake flow path 32 and the protrusion 206. This secures air tightness at the coupling surface 64 between the upstream compressor duct 38 and the compressor housing 52a.

Ejector Mechanism 210

The ejector mechanism 210 is a fluid pump for vaporized fuel which lets in compressed air pressurized by the compressor impeller 52b and circulates the compressed air to the upstream side of the compressor impeller 52b. Then, utilizing the negative pressure produced when the compressed air flows through an interior of the ejector mechanism 210, the ejector mechanism 210 draws in vaporized fuel from a vaporized fuel introduction path (purge introduction path) 208 coupled to the circulation path 200.

The ejector mechanism 210 includes an ejector body 212, a chamfered portion 214, and a diffuser portion 216. The ejector body 212 has a tapered shape whose inside diameter decreases from the upstream side to the downstream side.

The ejector body 212 is inserted from the compressor housing 52a side into a hole of the protrusion 206 of the upstream compressor duct 38 and welded to an inner peripheral surface of the hole so that an upstream-side end portion 220 of the ejector body 212 is positioned at a distal end of the protrusion 206 (an end thereof on the upstream side in the circulation path 200). Therefore, the upstream-side end portion 220 of the ejector body 212 is inserted into the recess 204 of the compressor housing 52a. That is, at least a portion of the ejector body 212 is disposed in the protrusion 206 and the protrusion 206 is inserted into the recess 204. Furthermore, the ejector body 212 is disposed in the circulation path 200 upstream of the location at which the vaporized fuel introduction path 208 is coupled to the circulation path 200.

The chamfered portion 214 is formed in the circulation path 200 downstream of the ejector body 212. The chamfered portion 214 has an inside diameter that is larger than an outside diameter of a downstream-side end portion 230 of the ejector body 212. The downstream-side end portion 230 of the ejector body 212 is located within the chamfered portion 214.

The vaporized fuel introduction path 208 is coupled to the chamfered portion 214. The vaporized fuel introduction path 208 protrudes in a direction substantially orthogonal to the circulation path 200 and communicates with the upstream-side purge flow path 122. Therefore, vaporized fuel released from the canister 112 and flowing through the upstream-side purge flow path 122 is introduced to the chamfered portion 214 from a direction substantially orthogonal to the circulation path 200, through the vaporized fuel introduction path 208.

The diffuser portion 216 is formed in the circulation path 200 downstream of the chamfered portion 214 and is continuous from the chamfered portion 214. The diffuser portion 216 has a radially expanded portion 218 whose inside diameter gradually increases from an end portion of the diffuser portion 216 which is contiguous to the chamfered portion 214 toward the downstream side. Furthermore, the diffuser portion 216 has an opening in a downstream end of the radially expanded portion 218. This opening enables communication between the diffuser portion 216 and the intake flow path 32. Constructed in this manner, the diffuser portion 216 reduces the flow rate and simultaneously increases the pressure of compressed air and vaporized fuel flowing through the interior of the diffuser portion 216 and then introduces the compressed air and the vaporized fuel to the intake flow path 32.

As described above, in the vaporized fuel introduction apparatus 100 of this example, the circulation path 200 that circulates compressed air to the intake flow path 32 is made up of the housing-side flow path 202 formed within the compressor housing 52a and the duct-side flow path 203 formed within the upstream compressor duct 38. Furthermore, the ejector mechanism 210 is disposed within the circulation path 200.

Because of this, the need to provide a passageway, for instance, a passageway that guides compressed air from the supercharger to the ejector and a passageway that guides compressed air and vaporized fuel from the ejector to the intake flow path as in the related art is eliminated, and consequently the number of component parts is reduced and the assembly operation becomes easier.

Furthermore, in the case where an ejector and another duct are coupled by different passageways as in the related art, these passageways need to be diagnosed for decoupling since these passageways guide vaporized fuel. In the vaporized fuel introduction apparatus 100 of this example, however, the circulation path 200 is made up of the housing-side flow path 202 formed within the compressor housing 52a and the duct-side flow path 203 formed within the upstream compressor duct 38. Therefore, the system for diagnosing the decoupling of these passageways is no longer necessary, so that the cost needed for diagnosis can be reduced.

Furthermore, the ejector body 212 needs a certain length in the flow direction of compressed air in order to realize the Venturi effect. However, if the ejector body 212 is made excessively long, there arises a risk of interference of the ejector body 212, in terms of layout, with another passageway or the like provided in the vehicle.

Therefore, in the vaporized fuel introduction apparatus 100 of this example, the coupling surface 64 of the compressor housing 52a coupled to the upstream compressor duct 38 is provided with the recess 204 of a predetermined depth, and the upstream-side end portion 220 of the ejector body 212 is inserted into the recess 204. Due to this, in the vaporized fuel introduction apparatus 100, the entire ejector mechanism 210, which includes the ejector body 212, can be disposed further toward the compressor housing 52a side, so that the foregoing layout constraint can be eased.

While the preferred example of the present invention has been described with reference to the drawings, it is apparent that the example and the like do not limit the present invention. It is apparent to a person having ordinary skill in the art that other various modifications and the like can be conceived within the scope of the invention described in the appended claims and such modifications are reasonably considered to be included within the technical scope of the invention.

Figure 3:
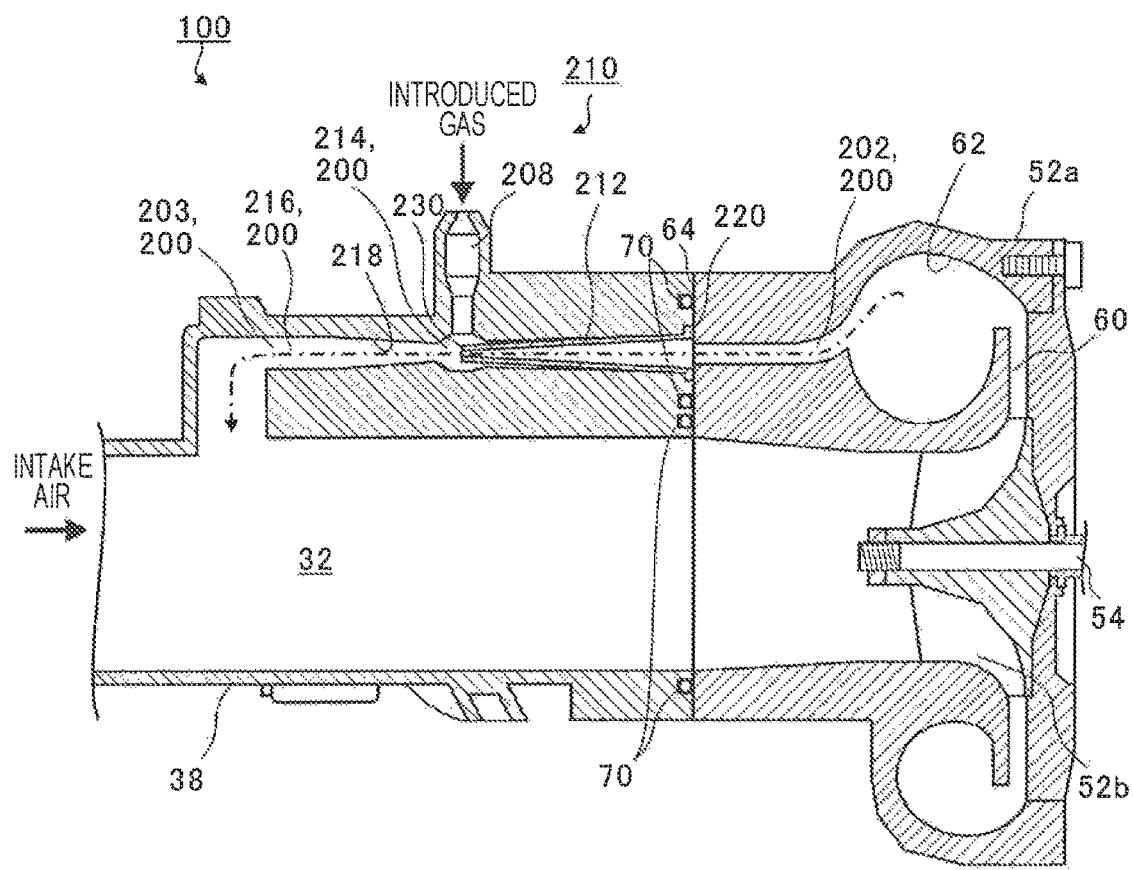
FIG. 3 illustrates a circulation path and an ejector mechanism according to a modification.

For instance, although in the foregoing example, the upstream-side end portion 220 of the ejector body 212 is inserted in the recess 204 formed in the compressor housing 52a, the recess 204 is not an essential component element. When a recess 204 is not provided, it suffices that, as illustrated in FIG. 3, the upstream compressor duct 38 is provided without a protrusion 206 and the upstream-side end portion 220 of the ejector body 212 is made flush with the coupling surface 64 between the upstream compressor duct 38 and the compressor housing 52a.

Furthermore, although in the foregoing example, vaporized fuel from the fuel tank 110 is introduced as an introduction gas to the intake flow path 32, blow-by gas leaking from the engine 10, instead of vaporized fuel, may be introduced as an introduction gas to the intake flow path 32. In this case, it suffices that a blow-by gas path through which blow-by gas flows is coupled to the vaporized fuel introduction path 208 and blow-by gas is introduced to the intake flow path 32 as in the foregoing example.

The present invention can be used for a vaporized fuel introduction apparatus that introduces vaporized fuel from the fuel tank to the intake flow path of the engine.

The invention claimed is:

1. A vaporized fuel introduction apparatus configured to introduce vaporized fuel to an intake system, the intake system comprising a compressor housing that houses a compressor impeller and an intake duct that is coupled to an upstream side of the compressor housing, the vaporized fuel introduction apparatus comprising:
   a circulation path that comprises a housing-side flow path provided as a single body with the compressor housing and a duct-side flow path provided as a single body with the intake duct and that is configured to circulate compressed air flowing in a portion of the compressor housing which is downstream of the compressor impeller to the intake duct;
   a vaporized fuel introduction path that is coupled to the circulation path and configured to guide the vaporized fuel; and
   an ejector mechanism that is provided in the circulation path,
   wherein the compressor housing comprises, in a coupling surface coupled to the intake duct, a recess that is configured to communicate with the housing-side flow path and that is recessed to a predetermined depth,
   wherein the elector mechanism comprises an ejector body having a tapered shape whose inside diameter decreases from an upstream side toward a downstream side, and
   wherein the intake duct comprises, on a coupling surface coupled to the compressor housing, a protrusion that is provided with at least a portion of the ejector body and that is inserted into the recess.

2. The vaporized fuel introduction apparatus according to claim 1, wherein the housing-side flow path forks from a compressor scroll path that is provided in the compressor housing.

* * * * *